(12) United States Patent
Walti et al.

(10) Patent No.: US 12,338,072 B1
(45) Date of Patent: Jun. 24, 2025

(54) SYSTEM AND/OR METHOD FOR DYNAMIC REBALANCING OF MULTI-RACK STORAGE

(71) Applicant: Mytra, Inc., South San Francisco, CA (US)

(72) Inventors: Christopher Walti, South San Francisco, CA (US); Ahmad Baitalmal, South San Francisco, CA (US); Jefferson Packer, South San Francisco, CA (US); Michael Brevoort, South San Francisco, CA (US); Allen Ferrick, South San Francisco, CA (US)

(73) Assignee: Mytra, Inc., South San Francisco, CA (US)

( * ) Notice: Subject to any disclaimer, the term of this patent is extended or adjusted under 35 U.S.C. 154(b) by 0 days.

(21) Appl. No.: 18/964,303

(22) Filed: Nov. 29, 2024

Related U.S. Application Data

(60) Provisional application No. 63/604,069, filed on Nov. 29, 2023.

(51) Int. Cl.
| | |
|---|---|
| *B65G 1/04* | (2006.01) |
| *B25J 9/16* | (2006.01) |
| *B65G 1/06* | (2006.01) |
| *B65G 1/137* | (2006.01) |
| *G05B 13/02* | (2006.01) |

(52) U.S. Cl.
CPC .......... *B65G 1/137* (2013.01); *B25J 9/1664* (2013.01); *B65G 1/0414* (2013.01); *B65G 1/0471* (2013.01); *B65G 1/0478* (2013.01); *B65G 1/06* (2013.01); *B65G 1/065* (2013.01); *G05B 13/027* (2013.01)

(58) Field of Classification Search
CPC .... B65G 1/137; B65G 1/0414; B65G 1/0478; B65G 1/0471; B65G 1/06; B65G 1/065; G05B 13/027; B25J 9/1664
See application file for complete search history.

(56) References Cited

U.S. PATENT DOCUMENTS

| | | | |
|---|---|---|---|
| 7,381,022 B1 | 6/2008 | King | |
| 8,721,251 B1 * | 5/2014 | Razumov | B65G 1/0492 414/281 |
| 10,435,241 B2 | 10/2019 | Lert et al. | |

(Continued)

FOREIGN PATENT DOCUMENTS

| | | | | |
|---|---|---|---|---|
| WO | WO-2012123335 A1 * | 9/2012 | ........... | B65G 1/0485 |
| WO | 2022109452 A2 | 5/2022 | | |

*Primary Examiner* — Thomas Randazzo
(74) *Attorney, Agent, or Firm* — Jeffrey Schox; Evan Myers

(57) ABSTRACT

The system can include a warehouse management system, a motion planner, an optional user interface (UI), and/or any other suitable components. The system can include or interface with a set of robots and a cell frame structure. However, the system can additionally or alternatively include any other suitable set of components. The system functions to facilitate automated storage and/or retrieval of payloads (e.g., cell trays, pallets, etc.) within a warehouse. Additionally or alternatively, the system can function to dynamically rebalance and/or rearrange the payloads, such as to increase global throughput efficiency (e.g., reduce storage and/or retrieval times; reduce number of required actions; etc.).

20 Claims, 6 Drawing Sheets

(56) References Cited

U.S. PATENT DOCUMENTS

| | | | |
|---|---|---|---|
| 11,554,917 B2 * | 1/2023 | Stevens | G05D 1/0297 |
| 2008/0277243 A1 * | 11/2008 | Hayduchok | B65G 1/065 |
| | | | 198/463.6 |
| 2015/0178673 A1 * | 6/2015 | Penneman | B61K 1/00 |
| | | | 104/18 |
| 2017/0121110 A1 | 5/2017 | Zombori | |
| 2019/0375589 A1 * | 12/2019 | Gravelle | B65G 1/1373 |
| 2021/0347569 A1 | 11/2021 | Dayrell | |
| 2024/0140714 A1 | 5/2024 | Walti et al. | |

* cited by examiner

SYSTEM AND/OR METHOD FOR DYNAMIC REBALANCING OF MULTI-RACK STORAGE

CROSS-REFERENCE TO RELATED APPLICATIONS

This application claims the benefit of U.S. Provisional Application No. 63/604,069, filed 29 Nov. 2023, which is incorporated in its entirety by this reference.

This application is related to U.S. application Ser. No. 18/493,278, filed 24-OCT-2023, each of which is incorporated in its entirety by this reference.

TECHNICAL FIELD

This invention relates generally to the technology field of warehouse automation, and more specifically to new and useful systems and/or methods for dynamic rebalancing multi-rack warehouse storage in the warehouse automation field.

BACKGROUND

An automated storage and retrieval system (AS/RS) is a material storage system designed for automated storage and retrieval of parts or items in manufacturing, distribution, retail, and wholesale facilities. AS/RS system generally includes one or more automated storage and retrieval machines (such as guided vehicles, shuttles, robots, conveyors, elevators, and/or lifts) operating under computerized control that directs the machine to a location where parts or items loaded on a pallet are to be stored and/or picked up. For example, to store an item(s), a pallet or tray loaded with the item can be placed at an input station, and the information for the item is entered into a computer terminal to determine a suitable location for the item. The automated storage and retrieval machine then automatically moves the pallet or tray to the determined location and stores the load (with the pallet or tray). Later retrieval of the item can be then accomplished by specifying the location, where the same or different automated storage and retrieval machine can automatically navigate to and move the pallet or tray with the load.

With the advancement of automation technology, existing AS/RS systems have been able to configure a warehouse management system with strategies and processes that can automate different aspects of warehouse operation, including item stocking and retrieval. However, in order to achieve optimized performance, these strategies or processes are generally complex implementations of classical multi-level if-then processes, and are heavily reliant on strict rules to be implemented and reliant on experts for identifying and/or defining these rules governing the warehouse operation. Once set, these rules and strategies generally are static and do not change dynamically. However, in real applications, warehouse management parties frequently refine warehouse operations to increase efficiency and decrease operational costs. In addition, there are some unexpected activities or events that the defined rules may not apply. Therefore, having these complicated static automation strategies or processes in place sometime can cause downstream inefficiencies and issues due to the likely decaying optimization of the original settings as the warehouse operation evolves over time. Moreover, conventional AS/RS systems are constrained by the movement limitations of warehouse storage, which are often one or two dimensional in existing architectures, thus limiting the complexity of potential movements. Additionally, as the complexity of movements increases, the issues can be further exacerbated if the system experts defining these complicated rules have been released from their positions related to the warehouse operation and thus there are no available resources for troubleshooting.

Therefore, there is a need for an improved automation technology that can constantly optimize the performance of warehouse operations without requiring consistent inputs from experts.

DETAILED DESCRIPTION

The following description of the embodiments of the invention is not intended to limit the invention to these embodiments, but rather to enable any person skilled in the art to make and use this invention.

1. Overview

Figure 1:
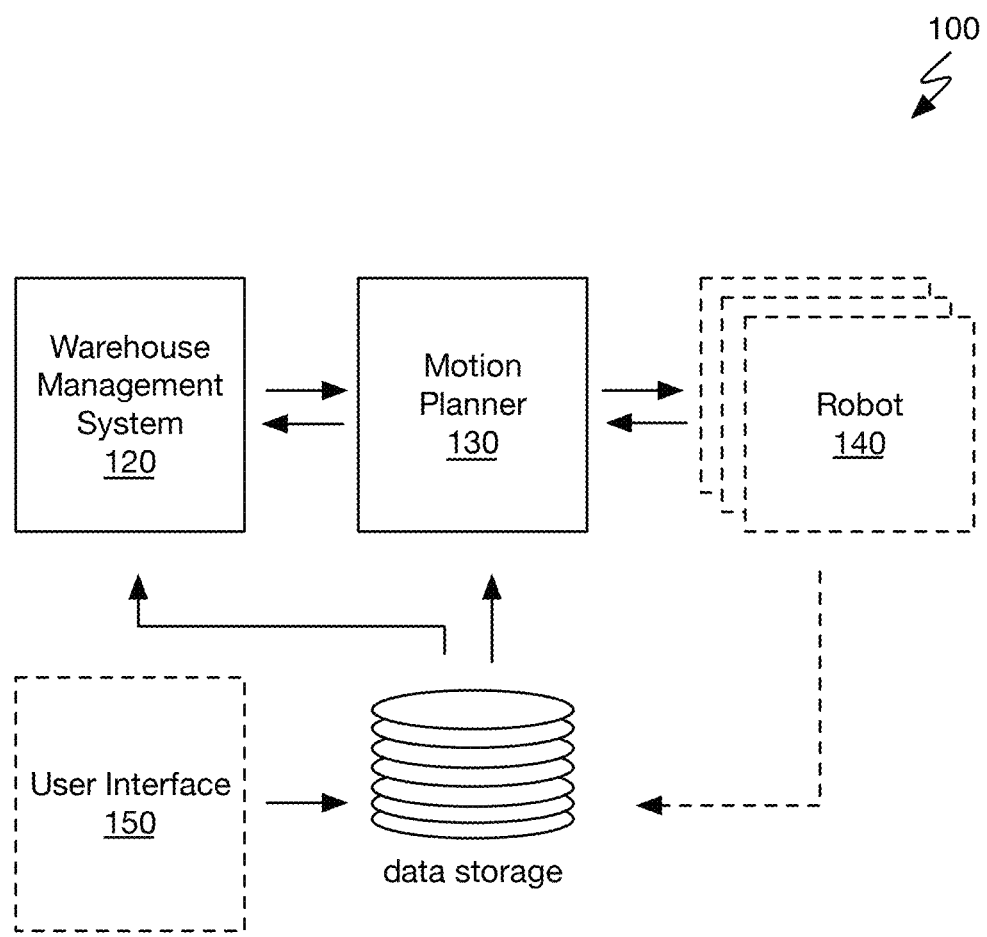
FIG. 1 is a schematic representation of a variant of the system.

The system 100, an example of which is shown in FIG. 1, can include a warehouse management system 120, a motion planner 130, an optional user interface (UI) 150, and/or any other suitable components. The system 100 can include or interface with a set of robots 140 and a cell frame structure. However, the system 100 can additionally or alternatively include any other suitable set of components. The system functions to facilitate automated storage and/or retrieval of payloads (e.g., cell trays, pallets, etc.) within a warehouse. Additionally or alternatively, the system can function to dynamically rebalance and/or rearrange the payloads, such as to increase global throughput efficiency (e.g., reduce storage and/or retrieval times; reduce number of required actions; etc.).

In variants, the system and/or method disclosed herein can incorporate an RL algorithm-based model (also referred to as "RL neural network") that can be trained to take the current state of the environment (e.g., current pallet locations, current positions, and actions of automated storage and retrieval machines and their respective plans, task queue, etc.) as input and output actions related to the warehouse operation. The RL neural network may be trained to select actions for multiple simulations, which return rewards defining how the neural network performed. The rewards and actions output by the neural network provide the signal that allows the network to be further trained and eventually optimized to get maximum rewards in optimizing the warehouse operation. The optimized RL neural network can place the inventory within the warehouse in the most efficient manner, so as to reduce the amount of movement and re-work necessary for the items stocked therein. As a result, the warehouse operation does not rely heavily on complicated inflexible automation strategies, but instead, the reinforcement learning algorithm would learn the most efficient strategy and would continually optimize as time goes on.

The term "substantially" as utilized herein can mean: exactly, approximately, within a predetermined threshold or tolerance, and/or have any other suitable meaning.

1.1 Illustrative Examples

In one set of variants, a method can include: receiving a set of inputs from the set of AS/AR robots within a multi-rack frame structure, the multi-rack frame structure defining a three-dimensional (3D) rectilinear grid of translation axes; based on the set of inputs, determining a current state of a warehouse, the state comprising a position of a plurality of payloads relative to the 3D rectilinear grid; based on the current state, determining a target state using a set of models comprising a neural network model pretrained by reinforcement learning (RL); at a centralized motion planner, determining instructions for each of the set of AS/AR robots based on the target state; and dynamically controlling the set of AS/AR robots based on the instructions.

In variants, the set of inputs further comprises a set of payload storage requests and a set of payload retrieval requests (e.g., manually determined via a UI).

In variants, the set of models comprises a neural network model which is pretrained by reinforcement learning (e.g., via S100), wherein the target state is determined using the neural network model based on the set of inputs. In variants, the set of models can additionally or alternatively include a predictive model configured to estimate a payload retrieval probability for each indexed payload based on the set of attributes, wherein the target state is determined using the neural network model based further on the estimated payload probability for each indexed payload. In variants, the management system is configured to update the target state in response to satisfaction of a trigger condition, wherein the trigger condition is based on at least one payload retrieval probability estimate.

In variants, the set of model is pretrained to optimize a reward function based on at least one parameter selected from a set of: payload density and payload throughput.

In variants, the management system is configured to periodically update the target state to dynamically reshuffle payloads. For example, the target state can be independent of the control instructions and/or can be determined concurrently with execution of a control instructions based on a prior target state. For instance, the target state can include a set of payload targets, wherein the motion planner is configured to determine the control instructions algorithmically based on a set of payload placement targets. As a second example, each robot of the plurality is configured to operate autonomously, based on the set of control instructions.

In one set of variants, a system for automated storage and automated retrieval (AS/AR) can include: a frame structure defining a three-dimensional (3D) rectilinear grid of cells; a plurality of robots within the frame structure configured to translate payloads between cells of the 3D rectilinear grid; a motion planner communicatively coupled to each of the plurality of robots and configured to provide instructions to each of the plurality of robots based on a target state of each robot and payload within the frame; and a management system comprising a set of models, the set of models configured to determine the target state with a set of inputs comprising: a position and a set of attributes for each of a plurality of indexed payloads; a set of predefined attributes of the rectilinear grid; a set of robot movement attributes; and a set of historic operation data.

In one variant, the 3D rectilinear grid defines a set input features for the neural network model. For example, the 3D rectilinear grid can include a plurality of interior nodes, wherein each interior node is intersected by a respective set of three orthogonal translation axes, wherein, at each interior node of the plurality of interior nodes, the set of AS/RS robots is configured to translate a payload of the plurality of payloads both directions along each orthogonal translation axis of the respective set.

In one variant, determining the target state comprises: scoring the current state of the warehouse and a set of candidate state perturbations using the neural network model. For example, the set of candidate state perturbations comprise dynamic reshuffling operations (e.g., actions which reshuffle/transform the payloads positions). As an example, the current state and the set of candidate state perturbations (e.g., robot actions which transform payloads) can be scored based on density and/or throughput of the warehouse.

In one variant, dynamically controlling the set of AS/AR robots comprises reshuffling payloads of the plurality of payloads within the multi-rack frame structure.

In one variant, the target state is further determined based on a set of historical warehouse attributes. For example, the current state can include the position of each payload of the plurality of payloads, indexed in association with a respective set of attributes, wherein the set of models receives the respective set of attributes and the position of each payload.

2. Benefits

Variations of the technology can afford several benefits and/or advantages.

First, variations of this technology can facilitate automated payload and/or robot routing within a three-dimensional array of cells (i.e., a multi-rack frame structure). For example, variants can autonomously route robots along 3D paths through the cell frame to facilitate storage and/or retrieval of payloads. Second, variations of this technology can improve throughput within the AS/AR system by dynamically 'reshuffling' payloads (e.g., contemporaneously with operation of one or more robots) based on a target state. Third, variants can facilitate high-order AS/AR operation (e.g., 2.5+ dimensional array movement) based on a flexible (e.g., 'learned') automation strategy(ies), such as RL algorithm-based model(s). In particular, NN-based and/or transformer-based models may facilitate performance improvements under real-time computing constraints compared to classical programmatic methods/heuristics (i.e., where optimizations with high-orders of complexity may not be analytically/iteratively solvable in real-time or near-real time; as possible actions may scale rapidly with the number of nodes, paths, robots, payloads, payload parameters/constraints, etc.). Fourth, variations of the technology can generalize a model(s) across operational archetypes (e.g., high density long-term storage, high-throughput job-shop warehouse, etc.) and/or facilitate transfer learning between archetypes. Fifth, variations of the technology can leverage prior use data from a particular warehouse to update a model(s) (e.g., train/update with reinforcement learning, etc.) to optimize placement strategies for a particular customer application.

Additionally, variations of this technology can include an approach necessarily rooted in computer technology for overcoming a problem(s) specifically arising in the realm of autonomous systems, such as state management and/or target selection for autonomous AS/AR planning and/or control, and/or other computer technology challenges.

However, variations of the technology can additionally or alternately provide any other suitable benefits and/or advantages.

3. System

The system 100, an example of which is shown in FIG. 1, can include a warehouse management system 120, a motion planner 130, an optional user interface (UI) 150, and/or any other suitable components. The system 100 can include or interface with a set of robots 140 and a cell frame structure. However, the system 100 can additionally or alternatively include any other suitable set of components. The system functions to facilitate automated storage and/or retrieval of payloads (e.g., cell trays, pallets, etc.) within a warehouse. Additionally or alternatively, the system can function to dynamically rebalance and/or rearrange the payloads, such as to increase global throughput efficiency (e.g., reduce storage and/or retrieval times; reduce number of required actions; etc.).

In variants, the system can include or operate in conjunction with the system(s) and/or method(s) as described in U.S. application Ser. No. 18/493,278, filed 24 Oct. 2023, titled "SYSTEM AND METHOD FOR NAVIGATING IN 3D FROM ANY CELL TO ANY CELL WITH A SINGLE MATERIAL HANDLING ROBOT," which is incorporated herein in its entirety by this reference. For example, the system can manage robots maneuverable within a 3D grid of cells, with robots and/or payloads translatable along in three-orthogonal sets of axes, each set defining a two-dimensional array of parallel axes. As a second example, the system can manage robots maneuverable within a three-dimensional rectilinear grid of cells, each cell defining a node between three-orthogonal translation axes.

In some variants, the system command and/or control (vertical) translation of robots using the system(s) and/or method(s) as described in U.S. application Ser. No. 18/531,184, filed 6 Dec. 2023, titled "DISCRETE ROLLER ASSEMBLY-BASED HELICAL DRIVE FOR TRANSLATION," which is incorporated herein in its entirety by this reference.

3.1 Management

The warehouse management system functions to determine a target state of the warehouse (i.e., target cell position for each payload and/or cell tray within the warehouse). For example, the warehouse management system can function to determine a target position/cell for an (indexed) payload entering the system, which can be provided to the motion planner to control robot motion and/or placement of the payload (e.g., cell tray and/or a pallet housed thereon) at the target position (e.g., target cell within the cell frame). Additionally, the warehouse management system can manage/direct dynamic rearrangement (a.k.a., reshuffling) of payloads based on the target state. For example, updates to the target state may direct actions/movements by one or more robots in order to improve the likelihood/probability of shorter retrieval distances, reduce the spatial density of payloads within the system, and/or reduce obstructions for future retrievals.

Additionally, the warehouse management system can optionally function to determine robot paths based on the target state (e.g., 3-dimensional paths), which can be commanded by a motion planner. Alternatively, the motion planner can determine robot paths and/or routing (e.g., algorithmically; with or without RL-model based approaches), the motion planner can be integrated within the warehouse management system (e.g., controller in-the-loop simulation/optimization), and/or the warehouse management system can otherwise coordinate with the motion planner to facilitate robot control.

The target state preferably includes a target location (e.g., coordinate position within the three-dimensional rectilinear grid) and/or grid cell for each (indexed) payload and/or each (indexed) robot, but can additionally or alternatively include status information (e.g., payload coupled/decoupled to a robot), robot configuration, a set of target actions (e.g., robot paths), and/or any other suitable information.

The warehouse management system preferably determines the target state based on a set of inputs, such as the current state estimate (i.e., belief state). The set of inputs can include: belief state parameter(s) (e.g., prior state estimate from a motion planner from n−1 timestep; robot locations based on feedback from robots; payload positions stored in memory and/or detected by perception, etc.) and/or feedback from the motion planner, but can additionally or alternatively be determined based on manual inputs at the user interface (e.g., user requests to retrieve a payload based on the index; user request to store a payload), automatic/autonomous determinations at a robot (e.g., receipt of a new payload at an ingress station), payload retrieval requests, payload storage requests, payload attributes (e.g., payload classification, weight, induction/receipt location, planned output location, identifying information, recipient, customer/application specific payload parameters, etc.), customer data (e.g., a schedule, a retrieval queue, an insertion queue, customer order/tracking information, etc.), and/or any other suitable input(s).

Additionally, the set of inputs can include physics models/controllers and/or motion constraints for the robot (e.g., max traversal rate/acceleration in each axis, which may be a function of payload weight; predetermined/estimated time period of configuration and/or direction changes; etc.).

Additionally, the set of inputs and/or target state can be determined based on the physical constraints of the structure (e.g., predetermined/predefined via the user interface and/or during initialization of the system). For example, the structure can be defined relative to a set of (indexed) nodes/cells and/or indexed edges (e.g., three-dimensional rectilinear grid connections between adjacent nodes/cells along each axis of the frame. However, it is understood that the system and/or structural constraints can be otherwise suitably defined (e.g., relative to boundaries, bounding boxes, etc.). However, the target state can be otherwise determined based on any other suitable set of input(s)/parameter(s) from any suitable source(s).

The target state is preferably determined with a set of models. For example, the warehouse management system can include a set of models executed (e.g., during S200) at a processing system (e.g., centralized, distributed, local, remote, etc.) of the warehouse management system. The models can include classical or traditional approaches, machine learning approaches, and/or be otherwise configured. The models can include regression (e.g., linear regression, non-linear regression, logistic regression, etc.), decision tree, LSA, clustering, association rules, dimensionality reduction (e.g., PCA, t-SNE, LDA, etc.), neural networks (e.g., CNN, DNN, CAN, LSTM, RNN, encoders, decoders, deep learning models, transformers, etc.), ensemble methods, optimization methods, classification, rules, heuristics, equations (e.g., weighted equations, scoring functions, energy maximization, energy minimization, etc.), selection (e.g., from a library), regularization methods (e.g., ridge regression), Bayesian methods (e.g., Naiive Bayes, Markov), instance-based methods (e.g., nearest neighbor), kernel methods, support vectors (e.g., SVM, SVC, etc.), statistical methods (e.g., probability), comparison methods (e.g., matching, distance metrics, thresholds, etc.), deterministics, genetic programs, and/or any other suitable model(s). The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights and/or connections can be learned through training); a set of connected convolution layers (e.g., in a CNN); a set of self-attention layers; and/or have any other suitable architecture.

Models can be trained, learned, fit, predetermined, and/or can be otherwise determined. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation (e.g., using gaussian processes), backpropagation, and/or otherwise generated. The models can be learned or trained on: labeled data (e.g., data labeled with the target label), unlabeled data, positive training sets (e.g., a set of data with true positive labels, negative training sets (e.g., a set of data with true negative labels), historical application/customer-specific data, and/or any other suitable set of data.

Any model can optionally be validated, verified, reinforced, calibrated, or otherwise updated based on newly received, up-to-date measurements; past measurements recorded during the operating session; historic measurements recorded during past operating sessions; or be updated based on any other suitable data.

Any model can optionally be run or updated: once; at a predetermined frequency; every time the method is performed; every time an unanticipated measurement value is received; or at any other suitable frequency. Any model can optionally be run or updated: in response to determination of an actual result differing from an expected result; or at any other suitable frequency. Any model can optionally be run or updated concurrently with one or more other models, serially, at varying frequencies, or at any other suitable time.

Based on the inputs, the set of models can determine a score(s) for the warehouse state and/or a subset of payloads therein. In a first example, the model(s) can determine a score/probability for an individual payload(s), such as to characterize likelihood of retrieval and/or ease of retrieval relative to the current warehouse state. In a second example, the model(s) can determine a (global) score/probability that another retrieval request will be processed based on current state and/or prior retrieval history (e.g., lull in activity may enable one or more robots to engage in reshuffling without hindering operational flow; the model can predict a probability of future actions/request based on the set of inputs). In a third example, the model(s) can score an action(s) (e.g., jointly score a target state along with the predicted action to achieve the target state). Additionally or alternatively, the set of models can output: 3D heatmaps (e.g., volumetric density and/or probability distributions), classification probabilities, and/or generate other suitable output formats.

In variants, the warehouse automation system the scores and/or probabilities determined by the model(s) can be used to determine the target state and/or target actions associated therewith to facilitate robot control via the motion planner.

In a first variant, the reshuffling can be triggered based on satisfaction of a probability threshold (e.g., likelihood of a request to retrieve an inaccessible payload).

In a second variant, the warehouse automation system can provide an updated target state based on a joint optimization of probability In a third variant, the warehouse automation system can dynamically update the target state and/or actions contemporaneously with (and/or independently of) current operation(s). In a first example, the warehouse automation system may cancel/override current actions (e.g., reassign placement location of a payload being manipulated; reassign a robot traversing to manipulate a first payload to a separate action/takt; etc.) and/or direct a first set of robots to dynamically reshuffle payloads synchronously with nominal operation of a second set of robots. In a second example, the warehouse automation system may dynamically optimize the target state contemporaneously with robot operation and/or control execution via the motion planner.

In a fourth variant, determining the target state comprises: scoring the current state of the warehouse and a set of candidate state perturbations using the set of models, wherein the target state is selected based on the scores (e.g., based on energy maximization, cost minimization, optimization, heuristics, etc.). For example, a set of candidate state perturbations can include dynamic reshuffling operations, or actions which reshuffle/transform the payloads positions. As a second example, the current state and the set of candidate state perturbations (e.g., robot actions which transform payloads) can be scored based on density and/or throughput of the warehouse. Additionally or alternatively, dynamically controlling the set of AS/AR robots can include reshuffling payloads of the plurality of payloads within the multi-rack frame structure and/or any other suitable action(s).

However, the warehouse automation system can be otherwise configured.

3.2 Motion Planner

The motion planner functions to direct traversal of a set of robots within the warehouse automation system and/or cell frame architecture thereof. Additionally or alternatively, the motion planner can function to impose robot collision constraints, maintain state awareness of robots and/or robot trajectories throughout the cell frame, and/or provide any other suitable functionalities.

The motion planner preferably receives a target state and/or a set of target payload/cell endpoints from the warehouse management system determines a set routing and/or control instructions for the robots based on the target state. For instance, the motion planner can direct robot actions, paths, trajectories, and/or can provide any other suitable control outputs to robots within the system. In a first variant, the motion planner can generate robot routes and/or control instructions based on the target state using classical methods and/or algorithmic techniques (e.g., sets of algorithms like cooperative ASTAR, conflict-based searches, cooperative searches, etc.). In a second variant, nonexclusive with the first, the motion planner and/or functionalities thereof can be integrated into the warehouse management system (and/or modeled/simulated by the warehouse management system). For example, the motion planner can determine robot routing/paths as part of a joint optimization of target payload position(s) and robot path(s) (e.g., using the set of models). Alternatively, the motion planner can determine robot routes using model-based approaches, independently of the warehouse management system (e.g., where the models can be the same or different).

The motion planner can include processing and/or processing modules which can be: local, remote (e.g., at a remote server, at a third party server, cloud processing, etc.), centralized, distributed, and/or processing for the motion planner can be otherwise executed. The motion planner preferably manages the current state within a unified database/repository (e.g., maintaining redundancy and/or concurrency) and/or other data storage system. In a complete loss of power and/or communications at the motion planner (e.g., total power outage), the existing reservations remain, thereby maintaining belief state awareness.

The system can include or be used in conjunction with a robot(s) which traverse within a cell frame according to the motion plan and/or commands associated therewith. The robots can include a sensor suite, a controller, and/or any other suitable elements. The sensor suite functions to collect sensor data (e.g., localization, imaging, etc.), with which the robot and/or controller thereof can estimate the robot state and execute vehicle control (e.g., based on instructions from the motion planner). However, the robot can include any other suitable elements and/or can be otherwise configured.

The controller functions to control a robot based on the instructions from the motion planner. More preferably, the controller can facilitate autonomous, semi-autonomous, and/or automated operation of the robot along a path to a target endpoint to achieve the target state of the warehouse (e.g., based on the motion plan and/or instructions from the motion planner). The robot preferably communicates control and/or state feedback to the motion planner, which can be used to update the current state representation of the warehouse (e.g., to facilitate planning and/or control). The feedback from the robot provided to the motion planner can include: state information, estimated payload attributes (e.g., volumetric footprint, mass, etc.), a robot trajectory, robot position (e.g., coordinate position), position-velocity-acceleration (PVA) data, battery characteristics (e.g., state of charge, state of health, state of power, etc.), diagnostic parameters (e.g., battery characteristics, powertrain characteristics, sensor characteristics, etc.), environmental representations (e.g., classification of objects/obstacles in the environment), and/or any other suitable vehicle state parameters/estimates. Additionally or alternatively, the robot can provide any other suitable feedback and/or data to the motion planner.

However, the system can include or operate in conjunction with any other suitable motion planner(s) and/or robot(s).

3.3 User Interface

The system can optionally include or be used with a user interface which functions to facilitate storage and/or retrieval requests for a payload(s). Additionally or alternatively, the user interface can function to facilitate robot tele-operation (e.g., manual provision of control instructions to individual robots), manual exception handling, manual updates to target state, and/or other manual interventions/inputs. Additionally or alternatively, the UI can facilitate manual provision of payload information and/or attributes to the warehouse management system, which may be used for target state determination and/or optimization of payload arrangements.

The user interface can be communicatively connected to the warehouse management system and/or motion planner to provide manual commands for robot routing. For example, the UI can be wiredly and/or wirelessly connected to a centralized computing system executing the warehouse management system. As a second example, the UI can be connected to the warehouse management system and/or motion planner via an API, third party server, cloud service, and/or otherwise suitably facilitate manual inputs to the system.

However, the system can include or be used with any other suitable user interface and/or can exclude a user interface.

4. Method

Figure 2:
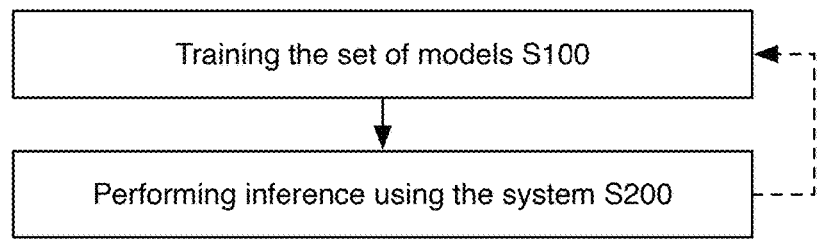
FIG. 2 is a diagrammatic flowchart representation of a variant of the method.

The method, an example of which is shown in FIG. 2, can optionally include training the model S100; and performing inference using the system S200. The method functions to perform automated storage and/or retrieval of payloads (e.g., pallets). Additionally or alternatively, the method can facilitate to manage the arrangement (e.g., relative density) of payloads within a warehouse storage system, such as the cell framework described in application Ser. No. 18/493,278, filed 24 Oct. 2023, each of which is incorporated in its entirety by this reference. The method can additionally or alternatively function to train and/or update the set of models.

S100 function to provide a set of models and/or generate a set of (trained) models to facilitate execution of Block S200. Performing inference using the system S200 functions to facilitate AS/AR. Additionally or alternatively, the system can facilitate dynamic motion planning and/or target state updates.

Figure 3:
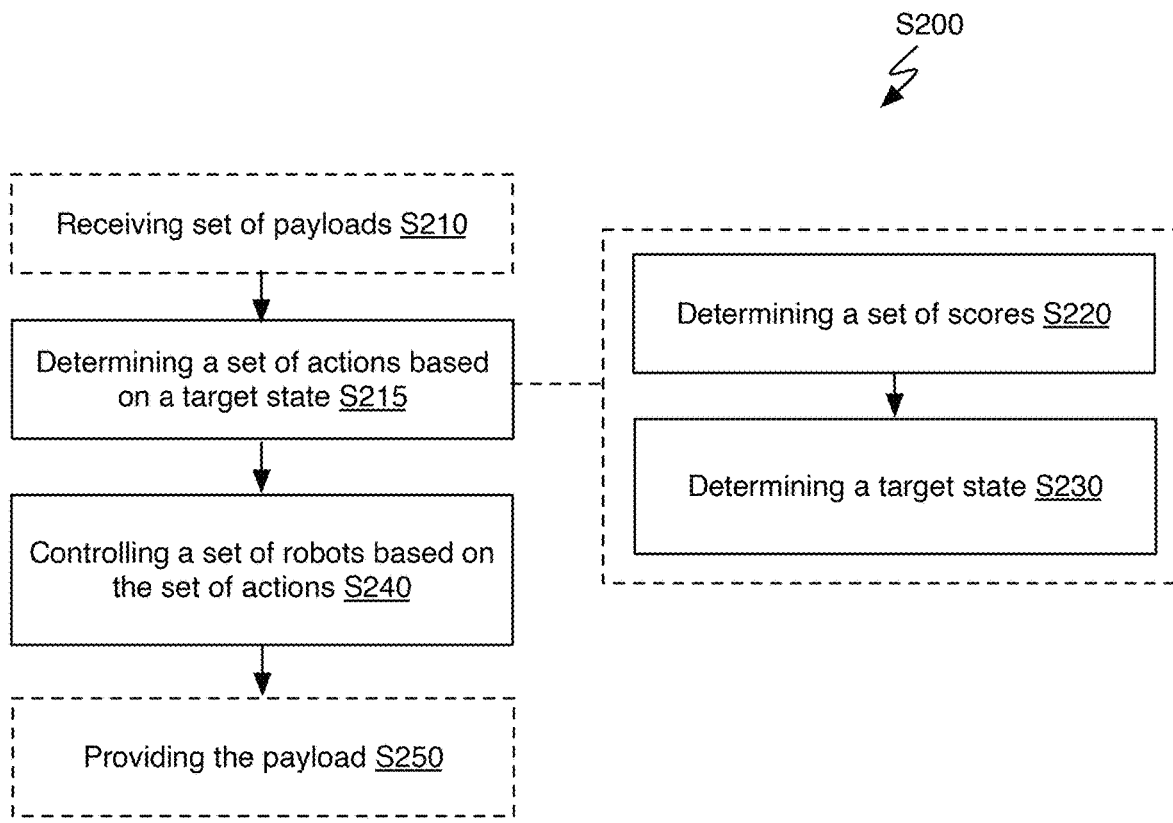
FIG. 3 is a diagrammatic flowchart representation of a variant of the method.

S200, an example of which is shown in FIG. 3, can include: determining a set of actions based on the target state S215; and controlling a set of robots based on the set of actions S240. S200 can optionally include receiving a set of payloads S210 and providing a payload S250. S215 is preferably executed by the warehouse management system 120 using the set of models thereof and functions to facilitate management of the warehouse state, but can additionally or alternatively be executed by the motion planner. For example, S215 can include determining a set of scores S220, determining a target state S230, and/or any other suitable elements. Controlling the set of robots S240 functions to facilitate execution of the set of actions based on instructions provided to the robots by the motion planner. S240 is preferably executed at the motion planner 130 and/or a robot(s) 140, but can be otherwise performed.

The method can be performed periodically, continuously, over a discrete interval, in response to satisfaction of a trigger condition (e.g., receipt of manual input at the UI, receipt of an additional payload, receipt of a request to retrieve a payload, automatic timer trigger, density trigger, perceived robot obstruction, etc.), based on a manual input, and/or with any other suitable timing/frequency. All or portions of the method can be performed in real time (e.g., responsive to a request), iteratively, concurrently, asynchronously, periodically, and/or at any other suitable time. All or portions of the method can be performed automatically, manually, semi-automatically, and/or otherwise performed.

All or portions of the method can be performed by one or more components of the system, using a computing system, using a database (e.g., a system database, a third-party database, etc.), by a user, and/or by any other suitable system. The computing system can include one or more: CPUs, GPUs, custom FPGA/ASICS, microprocessors, servers, cloud computing, and/or any other suitable components.

The computing system can be local, remote, distributed, or otherwise arranged relative to any other system or module.

5. Variants

The present disclosure provides a novel and non-obvious reinforcement learning-based intelligent warehouse management system. According to some embodiments, the system disclosed herein includes an RL neural network that is configured to model a diversity of (complex) activities without requiring making restrictive assumptions (e.g., if-then rules) in modeling. This contracts to other existing AS/RS systems that typically require thorough domain language or rely on complex rules and/or restrictive assumptions made by experts in warehouse operation management. In other words, the RL neural network in the disclosed system works like a block box that turns data into decision-making in warehouse management by the algorithms included therein, without requiring much user input about the data as well as rules for processing these data. The RL neural network self-learns optimized actions in decision-making through a consistent training process based on the historical operation data (including the data used for the initial training as well as the actual operation data that can be consistently added to the historical data for consistent training of the RL neural network when it is implemented in actual applications).

In a specific example, the RL neural network included in the system may be trained based on the historical operation data of a warehouse in the last few months (e.g., 3 months, 6 months, 9 months, 12 months, 15 months, and so on). The historical operation data of the warehouse may include any action that has happened at any time point in the last few months. For example, assuming that a warehouse includes multiple automated storage and retrieval machines (which may be also referred to as "bots" for simplicity), the historical operation data may include information regarding which bot moves which pallet to which storage location or site for each item stocking task. The exact time length and the movement path of a bot for completing each task are also recorded in the historical operation data. Data related to item pick-up may be similarly obtained. Based on the historical operation data, the warehouse operation performance may be evaluated, e.g., by generating a certain reward value for each action and/or by generating an accumulative reward for the warehouse operation based on the reward generated for each action. Based on the generated rewards including the cumulative rewards, the RL neural network may optimize the performance in warehouse operation management by providing simulations that can maximize the rewards for actions as well as accumulative rewards. The simulations with maximum reward(s) provide a signal for the actions to be taken by the respective bots at any time point in warehouse operation, thereby optimizing the performance in automated warehouse operation.

In some embodiments, the exemplary input for the RL neural network at any moment may include a task list that lists tasks that are to be completed, e.g., items to be stocked and items to be picked up. The task list may be a dynamic list that may be updated at any time point. For example, once a task is completed, the task may be removed from the list. Once a new task is created, the task can be automatically added to the list. In some embodiments, the tasks in the last may be organized according to the time that a task is created, according to the priority of the task, among other possible factors. In some embodiments, the tasks in the list may be assigned to bots according to a first-in first-out policy where a task ranked on the top is first assigned to a bot. In some embodiments, other possible mechanisms may be explored to assign tasks to the bots.

In some embodiments, the exemplary options output by the RL neural network may include but are not limited to: 1) the ideal storage location triggered when the system needs to store a pallet, 2) a combination of what to move and which robot triggered when bots are available, and/or 3) specific directional actions for each robot at all timesteps. While option (1) is generally more constrained (e.g., there is only one or a limited number of ideal storage locations for a specific to-be-stocked item), options (2) and (3) may lead to dynamic rebalancing to some extent. For example, when determining what to move and which robot triggered when bots are available, the RL neural network may dynamically rebalance the assignments of bots so that the maximal rewards including the maximal accumulative reward can be achieved, as will be described more in detail later.

In some embodiments, the RL neural network disclosed herein may include one or more machine learning models configured to identify certain patterns in warehouse operation based on historical operation data. For example, the RL neural network may identify the average storage length of a type/model of items, the average moving speed of each bot, the normal idle location of each bot, normal "rush hours" in each weekday and/or weekend (if the warehouse is under operation in weekends), etc. Accordingly, when determining the ideal storage location triggered when the system needs to store a pallet, the RL neural network may make a decision based on the identified patterns. For example, real put/pick requests may lead to an understanding of what items will be picked soon. In addition, the RL network may also understand which items will be put into more accessible areas.

In some embodiments, a heat map may be automatically generated for each to-be-stocked pallet when a task is triggered. Here, the heat map may be a probability map that lists a probability for each storage site included in the multi-rack storage facility when determining a storage site for each pallet. In some embodiments, the heat map may be a dynamic map that can be changed dynamically based on the ongoing activities within the warehouse. For example, a pallet that is initially determined to be stored at a high-level rack can be changed to be stored at a lower-level rack when one or more sites become available after the initial site is determined.

In some embodiments, when generating the output actions, the RL neural network may run a series of simulations and check the rewards for each simulation. Each simulation may include a possible next action and/or a combination thereof. For example, in a simulation for a warehouse containing three bots, bot 1 may be simulated to move item A, bot B remains idle, while bot 3 is simulated to keep moving its current item C. In another simulation, bot 2 is simulated to move item A, bot 1 is simulated to remain idle, and bot 3 is simulated to keep moving its current item C. For the two simulations, the accumulated reward for each simulation may be also calculated. For example, if bot 1 moves item A, bot 1 may need to move a distance d1, which corresponds to a reward value of v1. If bot 2 moves item A, bot 2 may need to move a distance d2, which corresponds to a reward value of v2. If v2 is larger than v1 (e.g. when d2 is smaller than d1), the accumulative reward for the corresponding simulation may be larger, and thus the RL neural network may select actions in that simulation in the decision-making process (e.g., choose bot 2 to move item A in the decision-making process) to maximize the rewards.

It should be noted that the above exemplary application of the RL neural network in warehouse operation management is provided for illustrative purposes. In real applications, the RL neural network may be configured to handle much more complex situations in warehouse operation management. The specific implementations of the RL neural network may be further described in detail below.

Figure 4:
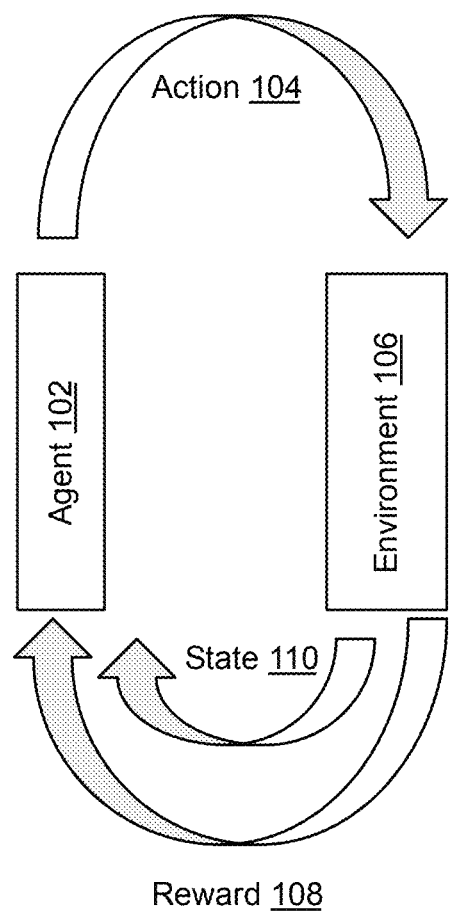
FIG. 4 is a diagrammatic representation of a variant of the method.

FIG. 4 illustrates an example operation of an RL neural network, according to some embodiments. According to FIG. 1, an exemplary framing of an RL scenario includes that an agent 102 takes actions 104 in an environment 106, which is interpreted into a reward 108 and a representation of the state 110, which are fed back into agent 102. Specifically, an AI-equipped reinforcement learning agent 102 may interact with its environment 106 in discrete time steps. At each time, agent 102 receives the current state 108 and reward 106. Agent 102 then chooses action 104 from the set of available actions, which is subsequently sent to environment 106. The environment 106 moves to a new state 108 and the reward 106 associated with the transition is determined. The goal of a reinforcement learning agent 102 is to learn a policy, which maximizes the expected cumulative reward. That is, a policy (which may act like rules in other existing AS/RS systems) is learned through the process without requiring experts to provide necessary inputs.

Referring to FIG. 4, an agent 102 may take specific actions 104. For example, in the warehouse operation disclosed herein, an agent may refer to a bot, which takes actions in item stocking and/or picking up.

Action 104 refers to a set of all possible moves an agent can make. An action is almost self-explanatory, but it should be noted that agents usually choose from a list of discrete, possible actions. For example, a bot can choose to move up, down, left, right, back, forward, or wait at any time point. In some embodiments, when determining actions for all bots, a dynamic rebalance may be applied. For example, actions for a set of bots in a warehouse may include a combination of what to move and which robot triggered when bots are available (e.g., move_from, move_to, robot_id for each specific task in the task list). In another example, actions may also include the specific directional actions for each robot at all timesteps.

Environment 106 refers to a world through which the agents move, and which responds to the agents. The environment takes an agent's current state and action as input, and returns as output the agent's reward and its next state. For example, a warehouse may be considered the environment in the system disclosed herein.

State 108 refers to a concrete and immediate situation in which an agent finds itself, e.g., a specific place and moment. A state(s) can refer to the current situation returned by the environment, or any future situation. For example, the current state of a warehouse may include current pallet locations, current bot positions and plans for each bot, task queue, etc. In some embodiments, the current state may be input into the RL neural network, which then outputs actions based on the inputs (e.g., where to store an item, which bot handles a new task).

Reward 110 refers to the feedback by which to measure the success or failure of an agent's actions in a given state. From any given state, an agent sends output in the form of actions (also referred to as "simulations") to the environment, and the environment returns the agent's new state (which resulted from acting on the previous state) as well as rewards, if there are any. Rewards can be immediate or delayed, which can be used to effectively evaluate the agent's action. For example, for a bot that is in the movement to stock a pallet or has stocked a pallet in the storage area, a reward may be obtained. The exact value of the reward may depend on the distance that the bot has moved, the ideal position where the pallet has been stocked, and so on. Exemplary factors considered for rewards for the disclosed system may include but are not limited to whether a bot delivers a pick request on time, whether a pallet is loaded quickly, whether a bot is getting collision with other bots or pallets, etc.

In some embodiments, the reward may be determined for each action taken by each bot, which is then used to determine the accumulative reward, to evaluate how the agents performed. The rewards and agent actions provide the signal that allows the RL network to be trained and eventually maximize the reward.

Accordingly, in some embodiments, the environment 106 may include functions that transform an action 104 taken in the current state into the next state 108 and a reward 110. Agents 102 may include functions that transform the new state 108 and reward 110 into the next action 104. In general, an agent's function may be defined or set through user input, but in most situations, the function of the environment (e.g., warehouse) is unknown due to the complexity of the environment (e.g., unpredicted activities or events in the warehouse operation). This is where reinforcement learning is useful. Here, reinforcement learning acts like a black box where the inputs and outputs are observed. Reinforcement learning represents an agent's attempt to approximate the environment's function, such that actions can be sent into the black-box environment that maximizes the rewards it spits out. Reinforcement learning thus judges actions by the results these actions produce. Reinforcement learning thus is goal orientated and the objective is to learn sequences of actions that will lead an agent to maximize its objective function. In terms of a warehouse, the maximized objective function may take into consideration rewards generated by the actions of each bot included therein, which can be used to govern the actions that bots can take at any moment.

Figure 5:
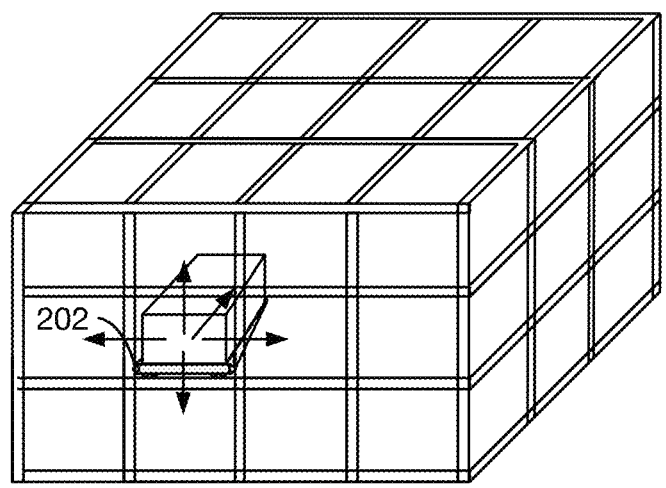
FIG. 5 is a schematic representation of a variant of the system.

Although not specified, in some embodiments, different from other existing AS/RS systems, a bot 102 disclosed herein may move up and down when the warehouse is a multi-rack storage facility. That is, the actions of a bot may include moving up or moving down beside the general move left, right, forward or backward as other automated storage and retrieval machines do. FIG. 5 illustrates an example bot 202 that can move in six different directions (although only five directions are shown in the figures). The bot may be configured to include wheels and the multi-rack storage facility may be configured to include specialized tracks, which together allow a bot to move up and down directly without external assistance from a lift.

Figure 6:
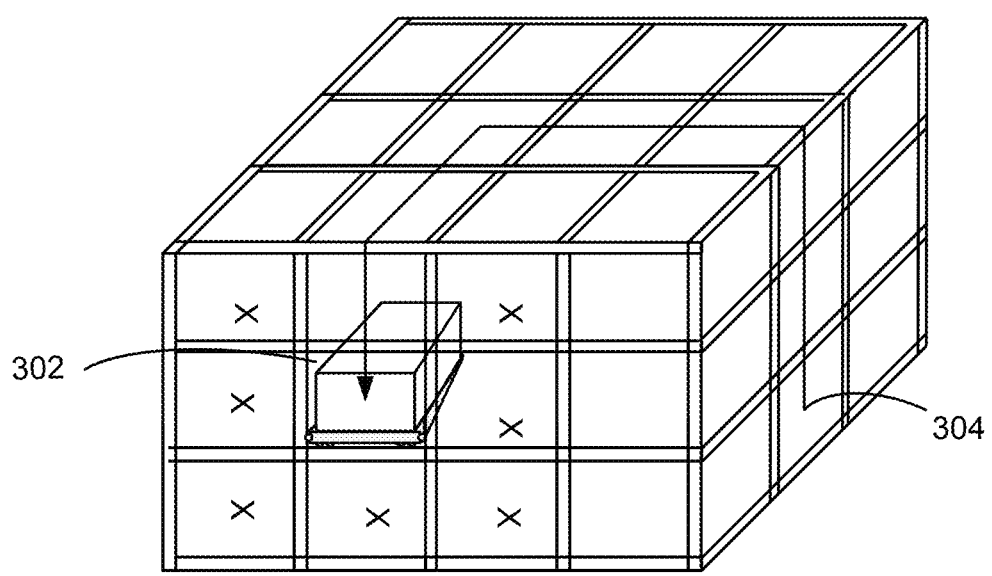
FIG. 6 is a schematic representation of a variant of the system.

In some embodiments, by allowing a bot disclosed herein to move up and down, it provides additional storage options for the multi-rack storage facility. For example, for a stock location 302 shown in FIG. 6 that is generally unavailable for stocking items due to the block from different horizontal directions (as indicated by "x" in FIG. 3 which shows the left, right, back (not shown), and bottom sides being blocked by the existing items), a bot may move along a path as indicated by the dotted arrow to move a pallet to stock it in the location 302. It should be noted that, while moving up/down increases the stock capacity of a warehouse under certain circumstances, it also provides additional complexity in warehouse operation management, which may require additional expertise to provide inputs in warehouse management in the existing AS/RS systems.

The RL neural network disclosed herein can handle the increased complexity without requiring extra user inputs, as the RL algorithms also treat the move-up and move-down actions similarly as other actions, that is, to determine rewards out of these actions, and to see whether and/or how these actions can maximize the rewards based on the historical data that indicates how these move up and move down actions benefit the overall operation of the warehouse.

In some embodiments, before being applied to real applications, an RL neural network may be first trained through simulated scenarios or monitored environments so that the RL neural network may experience various possible situations in real applications. For example, an RL neural network may be trained with training data containing different storage grid sizes or different initial conditions (pallets stored, bot position, etc.). In some embodiments, generative AI may be explored to create longer or different "pseudo" pick/put lists based on the ones that are currently available. This then allows the RL neural network to learn policies to handle certain unexpected application scenarios.

In some embodiments, the RL neural network disclosed herein may employ various reinforcement learning processes to improve performance, which may include but are not limited to deep reinforcement learning, adversarial deep reinforcement learning, fuzzy reinforcement learning, inverse reinforcement learning, safe reinforcement learning, etc. In some embodiments, the RL neural network disclosed herein may be implemented on one or more computing devices.

Figure 7:
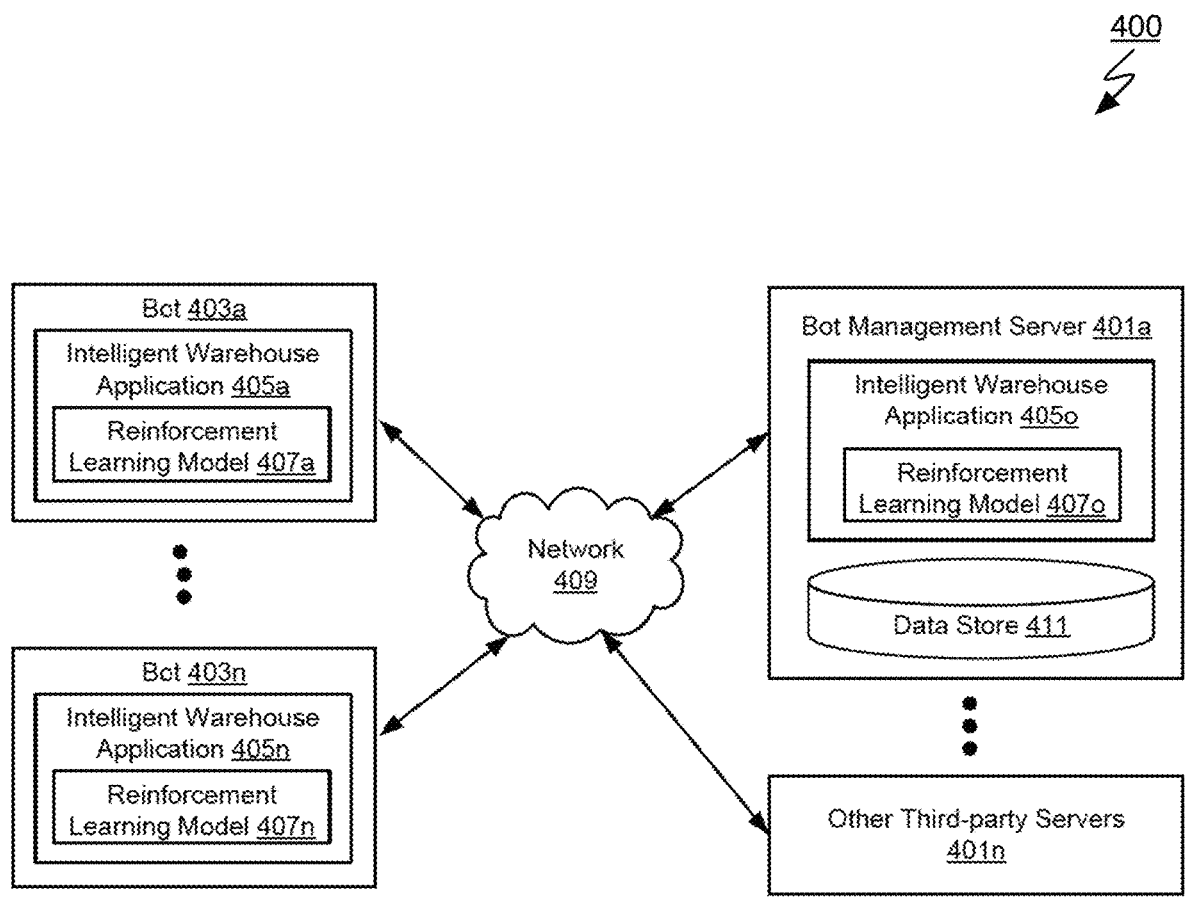
FIG. 7 is a schematic representation of a variant of the system.

FIG. 7 illustrates an example of system architecture 400 for implementing RL-based warehouse operation management, according to some embodiments. In the illustrated embodiment, the system 400 may take the form of hardware and/or software components running on hardware. For example, in system 400, certain software (e.g., applications or apps, operational instructions, modules, etc.) may be run on a processing device, such as a computer, mobile device (e.g., robot, moving vehicle, shuttle, or Internet of Thing (IoT) devices) and/or any other electronic device. In some embodiments, the components of the system 400 may be distributed across and executable by multiple devices. For example, location information and/or operation information of a bot may be locally collected (e.g., by one or more sensors) by the bots, which may be transmitted to and processed by other devices (e.g. servers or other bots) in a network.

As illustrated in FIG. 7, system 400 may include distributed bots 403a-403n (collectively or individually referred to as bot 403), network 409, and a server environment comprising one or more servers, including but not limited to bot management server 401a and one or more third-party servers 401n. One skilled in the art will appreciate that the scale of system 400 may vary and may include additional or fewer components than those illustrated in FIG. 7. In some embodiments, interfacing between components of system 400 may occur remotely, for example, where the components of the system 400 may be distributed across one or more devices of a distributed network.

Bot 403 may be configured to collect and transmit certain operation information of a bot. For example, a bot may include or may be coupled to one or more sensors configured to collect location information and operation parameters such as speeds, moving directions, and so on, which can be then transmitted to the bot management server 401.

As illustrated in FIG. 7, in some embodiments, a bot 403 may optionally include a respective intelligent warehouse application 405a or 405n. The bot management server 401a may include a data store 411 for storing bot data and storage items data as well as an instance of intelligent warehouse application 405o (405a . . . 405o together or individually referred to as intelligent warehouse application 405). The data store 411 and/or the intelligent warehouse application 405o may reside on a single server or may be spread across multiple servers, as desired or practical. The bot management server 401a may be implemented according to executable code and/or associated server components used to support computing on server 401a. The data store 411 may include one or more non-transitory computer-readable media, and may collectively comprise logical data, executable code, instructions, and/or associated components to support storage, data management, and retrieval of the calendar and/or user data. The bot data may comprise planned pathways for each bot, incoming tasks for each bot, current locations or operating parameters, etc., and the stored items data may include stored location information, expected storage time, specific item information, etc.

An intelligent warehouse application 405 may include an instance of reinforcement learning model 407a/407n/407o (together or individually referred to as reinforcement learning model 407), which may be an RL neural network as described above. An instance of reinforcement learning model 407 may perform some or all functions described above. For example, an instance of reinforcement learning model 407a or 407n on a bot 403a/403n may also perform the RL to determine an action for itself as well as other bots. In some embodiments, a bot 403 is more focused on data collection, data transmission, and action execution.

Bot management server 401a may be a cloud server that possesses larger computing/communication capabilities and computing resources than a bot 403 and therefore may perform more complex computations or communications than the bot 403 can. For example, more complicated decision-making processes for determining actions for each bot and the assignment of incoming tasks to each bot may be determined by the bot management server 401a.

In some embodiments, the bot management server 401a may be further configured to facilitate communication between the bots 403, and possibly other third-party servers(s) 401n. For example, bots 403 may exchange location and/or operation information via the bot management server 401a over the network 409, directly between bots 403 via the network 409, and/or through direct device-to-device information exchange, such as over a local pairing or network connection (e.g., Bluetooth, near-field communication, infrared, etc.).

Other third-party servers 40 in may be provided using other logical server instances or included with the bot management server 401a according to some embodiments. The third-party servers 40 in may provide additional services to the bot management server 401a, or the services may be provided directly to the bots 403. Server features and services may be related to item storage and retrieval. Examples of other server services may include, but are not limited to, certain ordering services and shipping information, and the like related to items stored in the storage facility.

Network 409 may be a conventional type, wired and/or wireless, and may have numerous different configurations, including a star configuration, token ring configuration, mesh configuration, or other configurations. For instance, network 409 may include one or more local area networks (LAN), wide area networks (WAN) (e.g., the Internet), public networks, private networks, virtual networks, mesh networks, peer-to-peer networks, and/or other interconnected data paths across which multiple devices may communicate. Network 409 may also be coupled to or include portions of a telecommunications network for sending data in a variety of different communication protocols. In some embodiments, network 409 includes Bluetooth communication networks or a cellular communications network for sending and receiving data including via short messaging service (SMS), multimedia messaging service (MMS), hypertext transfer protocol (HTTP), message queuing telemetry transport (MQTT), direct data connection, wireless application protocol (WAP), email, etc. In some embodiments, during data transmission in calendar creation and/or update, certain security mechanisms may be implemented in network 409, to ensure no user information is leaked during data transmission between the bots 403 and/or the bot management servers 401.

Different subsystems and/or modules discussed above can be operated and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A system for automated storage and automated retrieval (AS/AR) comprising:
    a frame structure defining a three-dimensional (3D) rectilinear grid of cells;
    a plurality of robots within the frame structure configured to translate payloads between cells of the 3D rectilinear grid;
    a motion planner communicatively coupled to each of the plurality of robots and configured to provide instructions to each robot of the plurality of robots based on a target state of each robot of the plurality of robots and payload within the frame; and
    a management system comprising a set of models, the set of models configured to determine the target state with a set of inputs comprising:
        a position and a set of attributes for each indexed payload of a plurality of indexed payloads;
        a set of predefined constraints of the rectilinear grid;
        a set of robot motion constraints; and
        a set of historic operation data.

2. The system of claim 1, wherein the set of inputs further comprises: a set of payload storage requests and a set of payload retrieval requests.

3. The system of claim 1, wherein each robot of the plurality of robots is configured to operate autonomously, based on the set of control instructions.

4. The system of claim 1, wherein the management system is configured to periodically update the target state to dynamically reshuffle payloads.

5. The system of claim 4, wherein the target state is periodically updated independently of the instructions provided to each robot of the plurality of robots.

6. The system of claim 5, wherein the target state comprises a set of payload targets, wherein the motion planner is configured to determine the instructions algorithmically based on a set of payload targets.

7. The system of claim 1, wherein the set of models comprises a neural network model which is pretrained by reinforcement learning, wherein the target state is determined using the neural network model based on the set of inputs.

8. The system of claim 7, wherein the neural network model is pretrained to optimize a reward function based on at least one parameter selected from a set of: payload density and payload throughput.

9. The system of claim 7, wherein the set of models further comprises a predictive model configured to estimate a payload retrieval probability for each indexed payload based on the set of attributes, wherein the target state is determined using the neural network model based further on the estimated payload retrieval probability for each indexed payload of the plurality of indexed payloads.

10. The system of claim 9, wherein the management system is configured to update the target state in response to satisfaction of a trigger condition, wherein the trigger condition is based on at least one payload retrieval probability estimate.

11. A method for a set of automated storage and automated retrieval (AS/AR) robots comprising:
    receiving a set of inputs from the set of AS/AR robots within a multi-rack frame structure, the multi-rack frame structure defining a three-dimensional (3D) rectilinear grid of translation axes;
    based on the set of inputs, determining a current state of a warehouse, the state comprising a position of a plurality of payloads relative to the 3D rectilinear grid;
    based on the current state, determining a target state using a set of models comprising a neural network model pretrained by reinforcement learning (RL);

at a centralized motion planner, determining instructions for each AS/AR robot of the set of AS/AR robots based on the target state; and dynamically controlling the set of AS/AR robots based on the instructions.

12. The method of claim 11, wherein dynamically controlling the set of AS/AR robots comprises reshuffling payloads of the plurality of payloads within the multi-rack frame structure.

13. The method of claim 11, wherein the 3D rectilinear grid defines a set of input features for the neural network model.

14. The method of claim 13, wherein the 3D rectilinear grid comprises a plurality of interior nodes, wherein each interior node is intersected by a respective set of three orthogonal translation axes, wherein, at each interior node of the plurality of interior nodes, the set of AS/RS robots is configured to translate a payload of the plurality of payloads in both directions along each orthogonal translation axis of the respective set.

15. The method of claim 11, wherein the target state is further determined based on a set of historical warehouse attributes.

16. The method of claim 15, wherein the current state comprises the position of each payload of the plurality of payloads, indexed in association with a respective set of attributes, wherein the set of models receives the respective set of attributes and the position of each payload.

17. The method of claim 11, wherein determining the target state comprises: scoring the current state of the warehouse and a set of candidate state perturbations using the neural network model.

18. The method of claim 17, wherein the set of candidate state perturbations comprise dynamic reshuffling operations.

19. The method of claim 17, wherein the current state and the set of candidate state perturbations are scored based on density.

20. The method of claim 19, wherein the current state and the set of candidate state perturbations are scored based on predicted payload throughput.

* * * * *